· US009563418B1

(12) United States Patent
Walton (10) Patent No.: US 9,563,418 B1
(45) Date of Patent: Feb. 7, 2017

(54) COMMUNICATION ENDPOINTS, SOFTWARE UPDATE SERVERS, AND RELATED METHODS

(71) Applicant: CaptionCall, LLC, Salt Lake City, UT (US)

(72) Inventor: Sean Walton, Orem, UT (US)

(73) Assignee: CaptionCall, LLC, Salt Lake City, UT (US)

( * ) Notice: Subject to any disclaimer, the term of this patent is extended or adjusted under 35 U.S.C. 154(b) by 0 days.

(21) Appl. No.: 14/670,257

(22) Filed: Mar. 26, 2015

(51) Int. Cl.
*G06F 9/44* (2006.01)
*G06F 9/445* (2006.01)
*H04L 29/06* (2006.01)

(52) U.S. Cl.
CPC .......... *G06F 8/65* (2013.01); *G06F 8/665* (2013.01); *H04L 63/0428* (2013.01)

(58) Field of Classification Search
CPC .............. G06F 8/61; G06F 8/65; G06F 8/665
USPC ................................................. 717/168–178
See application file for complete search history.

(56) References Cited

U.S. PATENT DOCUMENTS

| 6,161,218 | A | 12/2000 | Taylor |
| 7,600,021 | B2 | 10/2009 | Schottland et al. |
| 7,640,458 | B2 | 12/2009 | Rao et al. |
| 8,209,564 | B2 | 6/2012 | Vidal et al. |
| 8,233,893 | B2 | 7/2012 | Chen |
| 8,379,801 | B2 | 2/2013 | Romriell et al. |
| 8,908,838 | B2 * | 12/2014 | Engelke et al. ........ G10L 15/26 379/52 |
| 2005/0227683 | A1 | 10/2005 | Draluk et al. |
| 2011/0214018 | A1 | 9/2011 | Vidal et al. |
| 2011/0214112 | A1 | 9/2011 | Vidal et al. |
| 2011/0320794 | A1 * | 12/2011 | Yang et al. ..................... 713/1 |

FOREIGN PATENT DOCUMENTS

EP 2169545 A1 3/2010

OTHER PUBLICATIONS

Taskit GmbH, "Linux Guide", Jun. 2010, retrieved from http://www.taskit.de/tl_files/cust/dl/LinuxGuide_v1.27_EN.pdf , 65 pages.*
Nikolai Bezroukov, "The SUSE Rescue System", Jul. 2014, retrieved from http://www.softpanorama.org/Commercial_linuxes/Suse/Troubleshooting/suse_rescue_system.shtml, 6 pages.*

* cited by examiner

*Primary Examiner* — Ted T Vo
(74) *Attorney, Agent, or Firm* — TraskBritt (57) ABSTRACT

Communication endpoints, software update servers, and related methods are disclosed. A communication endpoint includes a data storage device including a boot loader partition, a boot loader settings partition, and a plurality of combo image partitions. A method includes receiving an update package including a new combo image and one or more repair modules configured to diagnose and repair at least one of a boot loader, boot loader settings, and a file system of the communication endpoint. The method also includes replacing a combo image stored on one of the plurality of combo image partitions with the new combo image, and executing at least one of the one or more repair modules. A software update server includes a data storage device including the update package, and communication elements configured to transmit the update package to the communication endpoint.

23 Claims, 4 Drawing Sheets

COMMUNICATION ENDPOINTS, SOFTWARE UPDATE SERVERS, AND RELATED METHODS

FIELD

The application relates to software updates for communication endpoints, and more particularly, to software updates for communication endpoints for audibly impaired users.

BACKGROUND

Systems including software elements, such as, for example, communication systems for audibly impaired people (e.g., deaf, hard-of-hearing, and speech impaired people) rely heavily on software updates to maintain reliability of software, and to incorporate new technological advances into existing devices. Conventionally, a great deal of time and effort has been required of software developers to work out issues arising from confusion between multiple different versions of the same software. For example, a first software product may have dependencies on certain versions of other software products. If the correct versions of the other software products are not used or available, the first software product may not function correctly.

As another example, a new software version may not be compatible with a system executing a predecessor software version. If the software is updated to the new version, the new version may not function properly.

BRIEF SUMMARY

A method of operating a communication endpoint is disclosed. The method includes receiving an update package from a software update server. The update package includes a new combo image, and one or more repair modules configured to diagnose and repair at least one of a boot loader, boot loader settings, and a file system of the communication endpoint. The method also includes replacing, with control circuitry, a combo image stored on one of a plurality of combo region partitions of a data storage device operably coupled to the control circuitry with the new combo image. The new combo image includes at least one of a new secondary boot loader, a new root file system, and a new operating system kernel. The method further includes executing, with the control circuitry, at least one of the one or more repair modules.

A communication endpoint is also disclosed. The communication endpoint includes a data storage device including a boot loader partition, a boot loader settings partition, a first combo image partition, and a second combo image partition. The boot loader partition includes a boot loader. The boot loader settings partition includes boot loader settings. The first combo image partition and the second combo image partition each include a combo image comprising a secondary boot loader, a root file system, and an operating system kernel. The communication endpoint also includes communication elements configured to receive an update package from a software update server through one or more networks. The update package includes a new combo image configured to replace the combo image stored in the first combo image partition and the second combo image partition. The update package also includes at least one repair module configured to diagnose and repair at least one of the boot loader, the boot loader settings, and a file system of the communication endpoint. The communication endpoint further includes control circuitry operably coupled to the data storage device and the communication elements. The control circuitry is configured to select one of the first combo image partition and the second combo image partition, and replace the combo image stored in the selected one of the first combo image partition and the second combo image partition with the new combo image. The control circuitry is also configured to execute the at least one repair module.

A software update server is also disclosed. The software update server includes a data storage device including an update package. The update package includes a new combo image configured to replace a combo image stored by a communication endpoint. The new combo image includes at least one of a new secondary boot loader, a new root file system, and a new operating system kernel. The update package also includes one or more repair modules configured to instruct the communication endpoint to diagnose and repair at least one of a boot loader, boot loader settings, and a file system of the communication endpoint. The software update server also includes communication elements configured to transmit the update package to the communication endpoint through one or more networks.

Also disclosed is a text-captioned phone configured to enable a user of the text-captioned phone to participate in substantially real-time communication sessions with an audibly capable user of a far-end audio endpoint through a first communication network with the assistance of a text-captioned relay service configured to communicate with the text-captioned phone through a second communication network. The text-captioned phone comprises a data storage device, communication elements, and control circuitry operably coupled to the data storage device and the communication elements. The data storage device includes a boot loader partition comprising a boot loader, a boot loader settings partition comprising boot loader settings, and a first combo image partition and a second combo image partition, each comprising a combo image including a secondary boot loader, a root file system, and an operating system kernel. The communication elements are configured to receive an update package from a software update server through one or more networks. The update package includes a file manifest including a checksum configured to verify the integrity of the update package, a new combo image configured to replace the combo image stored in the first combo image partition and the second combo image partition, a boot loader and settings repair module configured to at least one of diagnose, repair, and replace at least one of the boot loader and the boot loader settings, and a file system repair module configured to at least one of diagnose, repair, and replace a file system of the text-captioned phone. The new combo image includes at least one of a new secondary boot loader, a new root file system, and a new operating system kernel. The control circuitry is configured to select one of the first combo image partition and the second combo image partition, and replace the combo image stored in the selected one of the first combo image partition and the second combo image partition with the new combo image, and execute the boot loader and settings repair module and the file system repair module.

DETAILED DESCRIPTION

In the following detailed description, reference is made to the accompanying drawings which form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In addition, some of the drawings may be simplified for clarity. Thus, the drawings may not depict all of the components of a given apparatus (e.g., device) or method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

The disclosure also provides meaningful limitations in one or more particular technical environments that go beyond an abstract idea. For example, embodiments of the disclosure provide improvements in the technical field of providing software updates. In addition, embodiments of the disclosure improve the functionality of computing devices themselves. In particular, embodiments of the disclosure enable computing devices to repair damaged files and data using an update package received from a software update server.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g., 110) and specifically indicated by the numerical indicator followed by a numeric indicator preceded by a "dash" (e.g., 278-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Embodiments disclosed herein include software update servers configured to transmit update packages including repair modules to communication endpoints configured to enable audibly impaired people to participate in communication sessions for audibly impaired users (e.g., text-captioned communication sessions, video communication sessions, etc.), the communication endpoints, and related methods. These update packages may enable remote repair and customization of the communication endpoints from software update servers. It should be noted that while the utility and application of the various embodiments of the disclosure are described with reference to communication endpoints configured to enable audibly impaired people to participate in communication sessions, the disclosure also finds application to any environment where update packages including repair modules may be useful or desirable.

As used herein, the term "audibly impaired" refers to people having at least one form of audible impairment (e.g., people that are deaf, hard-of-hearing, speech impaired, or combinations thereof). The term "audibly capable" refers to people that are both hearing and speech capable.

As used herein, the term "communication endpoint" refers to a device or devices that enable users to participate in communication sessions that provide for substantially real-time communications between at least two parties (e.g., text-captioned phones, video phones, etc.). As used herein, the term "substantially real-time communications" refers to communications that are recorded, transmitted, and presented between the parties at least quickly enough for the parties to participate in conversations with audibly capable users of audio endpoints (e.g., traditional telephones, cellular telephones, VOIP telephones, etc.). More detail regarding a communication system 700 for providing these communication sessions is discussed below with reference to FIG. 7. A relay service may be employed to provide translation between non-audible communications (e.g., text captions, video recordings of American Sign Language communications, etc.) from a communication endpoint operated by an audibly impaired user, and voice communications from an audio endpoint operated by an audibly capable user. The relay service may be configured to enable substantially real-time communications between the communication endpoint and the audio endpoint. In some embodiments, a communication endpoint may include a text-captioned phone. As used herein, the term "text-captioned phone" refers to a communication endpoint configured to enable an audibly impaired user to participate in communication sessions with audibly capable users of audio endpoints through a text-captioned relay service. In some embodiments, a communication endpoint may include a video phone. As used herein, the term "video phone" refers to a communication endpoint configured to enable an audibly impaired user to participate in communication sessions with audio capable users of audio endpoints through a video relay service.

Figure 1:
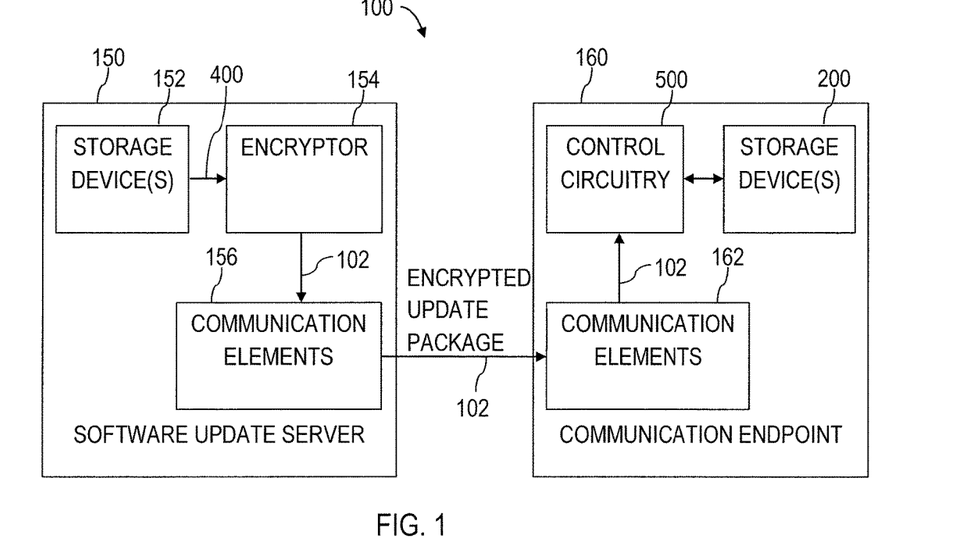
FIG. 1 is a simplified block diagram of a software update system.

FIG. 1 is a simplified block diagram of a software update system 100. The software update system 100 may include a software update server 150 and a communication endpoint 160. The software update server 150 may be configured to transmit an encrypted update package 102 configured to update at least one of software and firmware of the communication endpoint 160 of the communication endpoint 160. The encrypted update package 102 may be generated from an update package 400 that is generated by the software update server 150 and stored in the storage device 152 thereof. The update package 400 will be described more fully below with reference to FIG. 4. In general, the update package 400 is configured to customize, diagnose and repair at least one of a boot loader, boot loader settings, and a file system of the communication endpoint 160. Accordingly, the update package may enable software developers to not only distribute software updates, but customize and repair the communication endpoint 160 remotely without dispatching technicians to the site where the communication endpoint 160 is located. The update package 400 may also be configured to install at least one of software and firmware on the communication endpoint 160 when executed by the communication endpoint 160.

The software update server 150 may include one or more data storage devices 152 (hereinafter "storage" 152) configured to store data corresponding to the update package 400. The storage 152 may include at least one of volatile and non-volatile data storage. By way of non-limiting example, the storage 152 may include a hard disk drive (HDD), a solid state drive, flash memory, read only memory, random access memory, removable media (e.g., optical discs, magnetic discs, removable flash drives, etc.), electrically programmable read only memory (EPROM) other data storage devices, or combinations thereof. The software update server 150 may include control circuitry (not shown) operably coupled to the storage 152 and the communication elements 156 and configured to control the software update server 150. The control circuitry may include one or more processing elements operably coupled to a memory device, similar to the control circuitry 500 illustrated in and discussed below with reference to FIG. 5.

Figure 4:
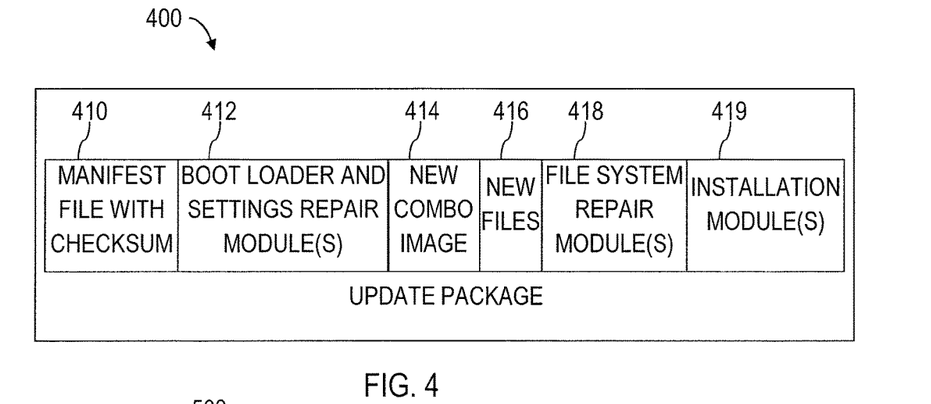
FIG. 4 is a simplified block diagram of an update package of the software update system of FIG. 1.

The software update server 150 may also include an encryptor 154 configured to generate the encrypted update package 102 from the update package 400. The encryptor 154 may be implemented using the control circuitry including software elements (e.g., computer readable instructions configured to instruct the control circuitry to encrypt the update package 400), hardware elements (e.g., a system on chip configured encrypt the update package 400), other control circuitry, or combinations thereof.

The software update server 150 may further include one or more communication elements 156 (hereinafter "communication elements" 156) configured to transmit the encrypted update package 102 to the communication endpoint 160 through one or more networks (e.g., Internet protocol networks, cloud networks, cellular data networks, PSTN networks, other networks, or combinations thereof).

The communication endpoint 160 may include control circuitry 500 operably coupled to one or more communication elements 162 (hereinafter "communication elements" 162) and a data storage device 200 (hereinafter "storage" 200). The control circuitry 500 may be configured to receive the encrypted update package 102 through the communication elements 162. The control circuitry 500 may also be configured to decrypt the encrypted update package 102 (e.g., using a local decryption key), and replace computer-readable instructions and files stored in the storage 200 with elements of the update package 400. The communication endpoint 160 may also be configured to execute the repair modules 412, 418 (FIG. 4) and the installation modules 419 (FIG. 4) of the update package 400 as will be discussed more fully below.

Figure 2:
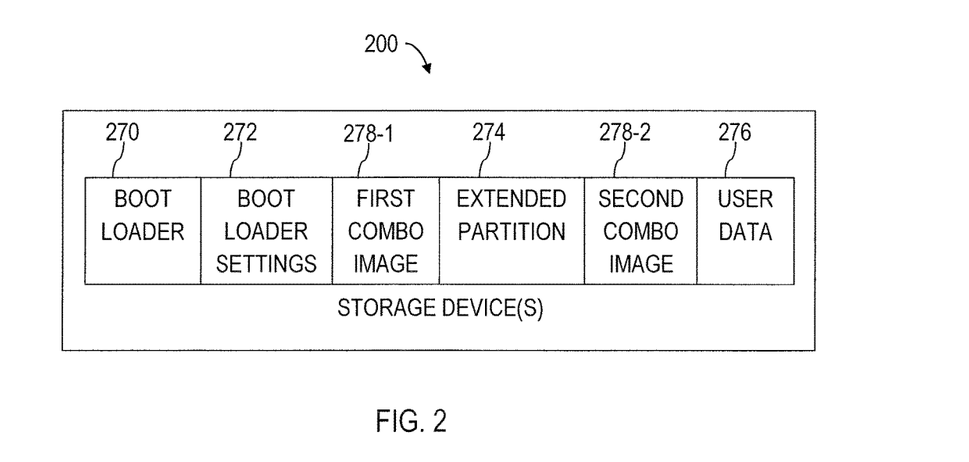
FIG. 2 is a simplified block diagram of a storage of a communication endpoint of the software update system of FIG. 1.

FIG. 2 is a simplified block diagram of the storage 200 of the communication endpoint 160 of FIG. 1. Referring to FIGS. 1 and 2 together, the storage 200 may include one or more arrays of memory elements (i.e., memory cells). In some embodiments, the storage 200 may include a flash (i.e., NAND) storage device, and the control circuitry 500 of the communication endpoint 160 may recognize the storage 200 as a flash drive. In some embodiments, the storage 200 may include other kinds of data storage devices. By way of non-limiting example, the storage 200 may include a hard disk drive (HDD), electrically programmable read only memory (EPROM), removable media (e.g., a memory card, a magnetic disk, an optical disk, a jump drive, etc.), other storage devices, and combinations thereof.

Figure 3:
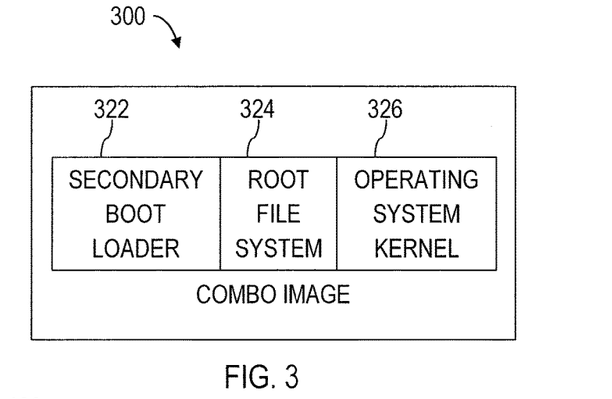
FIG. 3 is a simplified block diagram of a combo image that may be stored in combo image partitions of the storage of FIGS. 1 and 2.

The storage 200 may be partitioned into at least a boot loader partition 270, a boot loader settings partition 272, an extended partition 274, a user data partition 276, and first and second combo image partitions 278-1, 278-2 (sometimes referred to herein separately as "first combo image partition" 278-1 and "second combo image partition" 278-2, respectively, and together as "combo image partitions" 278). The boot loader partition 270 may include a boot loader, which in turn may include computer-readable instructions configured to instruct the control circuitry 500 (FIG. 1) to load an operating system of the communication endpoint 160. By way of non-limiting example, the boot loader may be configured to instruct the control circuitry 500 to select a combo image 300 (FIG. 3) stored in one of the combo image partitions 278, and load the operating system using the combo image 300 stored in the selected combo image partition 278. As used herein, the term "combo image" refers to contents and structure of at least a portion of a file system for the communication endpoint 160, including at least a secondary boot loader 322 (FIG. 3) a root file system 324 (FIG. 3), and an operating system kernel 326 (FIG. 3).

In some embodiments, the boot loader may be configured to enable the control circuitry 500 to address at least a minimum amount of storage of the storage 200. By way of non-limiting example, the boot loader may be configured to enable the control circuitry 500 to address at least ten (10) gigabytes (Gb), at least twelve (12) Gb, at least fourteen (14) GB, at least sixteen (16) Gb, at least eighteen (18) Gb, or at least twenty (20) Gb of storage of the storage 200. In some embodiments, the boot loader may be configured to enable the control circuitry to address at least substantially all storage of storage 200. As used herein, the term "at least substantially all storage" may refer to at least 90%, of the storage (including 100%) of storage 200.

The boot loader settings partition 272 may be configured to store boot loader settings data configured to influence how the boot-up process should proceed (e.g., an order of processes in boot-up, which storage location to boot from, etc.).

The extended partition 274 may be configured to serve as a placeholder to reserve storage space that may be used for various purposes in updates of the communication endpoint 160. For example, if the communication endpoint 160 receives an update package 400 including a new combo image 414 (FIG. 4) that requires more storage space than is available in the combo image partitions 278, the combo image partitions 278 and the extended partition 274 may be restructured to increase the storage capacity of the combo image partitions 278, at the expense of the extended partition 274. As used herein, the term "new combo image" refers to one or more files including contents and structure of at least a portion of a new file system (including at least one of a new secondary boot loader, a new root file system, and a new operating system kernel) for the communication endpoint 160. As needed, the storage space reserved by the extended partition 274 may be restructured to increase the storage capacity of the boot loader partition 270, the boot loader settings partition 272, the combo image partitions 278, and the user data partition 276.

The user data partition 276 may be configured to store user data associated with a user of the communication endpoint 160, scripts (e.g., configuration scripts), and other files that persist from boot-up to boot-up. By way of non-limiting example, the user data partition 276 may include user data corresponding to local databases, and user account information (e.g., account information associated with the user's use of the communication endpoint 160 in communication sessions with and without the assistance of a relay service), contacts lists, user preferences, caller identification information and preferences, information regarding recent calls, other user information, and combinations thereof.

The combo image partitions 278 may each store data corresponding to a combo image 300. FIG. 3 is a simplified block diagram of a combo image 300 that may be stored in the combo image partitions 278 of the storage 200 of FIGS. 1 and 2. Referring to FIGS. 1 through 3 together, the combo image 300 may include data corresponding to a secondary boot loader 322, a root file system 324, and an operating system kernel 326. As previously discussed, when the communication endpoint 160 boots up, the boot loader stored in the boot loader partition 270 may instruct the control circuitry 500 to boot-up using the combo image 300 stored in one of the combo image partitions 278. The control circuitry 500 may be configured to continue boot-up using the secondary boot loader 322 and the root file system 324 of the selected combo image 300. During and after boot-up, the operating system kernel 326 may be configured to serve as an interface between software (e.g., boot loaders, operating systems, software applications, etc.) and hardware elements (e.g., the control circuitry 500, the storage 200, input/output devices, system memory, etc.).

The combo image partitions 278 may each store the same combo image 300. Accordingly, the control circuitry 500 may successfully boot the communication endpoint 160 through use of the combo image 300 stored in either of the combo image partitions 278. If a boot-up using the combo image 300 stored in one of the combo image partitions 278 fails, the control circuitry 500 may attempt a second boot-up using the combo image 300 stored in the other of the combo image partitions 278. Accordingly, if the data stored in one of the combo image partitions 278 becomes damaged, the control circuitry 500 may still successfully boot-up in some instances.

FIG. 4 is a simplified block diagram of the update package 400 of the software update system 100 of FIG. 1. Referring to FIGS. 1, through 4 together, the update package 400 may include a manifest file 410 including a checksum (also known in the art as a "hash sum"), one or more boot loader and settings repair modules 412 (hereinafter referred to as "boot loader and settings repair modules" 412), a new combo image 414, new files 416, one or more file system repair modules 418 (hereinafter referred to as "file system repair modules" 418), and one or more installation modules 419 (hereinafter referred to as "installation modules" 419). The manifest file 410 may be configured to identify the contents of the update package 400, and provide computer-readable instructions for using the contents of the update package 400 (e.g., shell scripts). The checksum may be configured to enable the control circuitry 500 to verify the integrity of data and files included in the update package 400. When the communication endpoint 106 receives the encrypted update package 102, the control circuitry 500 may decrypt the encrypted update package 102, open the manifest file 410, and verify the integrity of the elements of the update package 400 using the checksum.

The new combo image 414 may be similar to the combo image 300 except that the new combo image 414 may include at least one of a new secondary boot loader, a new root file system, and a new operating system kernel, instead of the secondary boot loader 322, the root file system 324, and the operating system kernel 326. By way of non-limiting example, a new root file system may be simplified (e.g., minimized) to reduce the size of the new root file system, and improve efficiency and flexibility of the new root file system. Once the integrity of the new combo image 414 has been verified using the checksum, the control circuitry 500 may select one of the combo image partitions 278 to store the new combo image 414 in, and store the new combo image 414 in the selected combo image partition 278. The control circuitry 500 may overwrite data corresponding to the combo image 300 with data corresponding to the new combo image 414. If for some reason the control circuitry 500 fails to boot using the new combo image 414, the control circuitry 500 may reboot using the combo image 300 stored in the unselected one of the combo image partitions 278.

The repair modules 412, 418 may be configured to instruct the control circuitry 500 to diagnose and repair data (e.g., data files, local databases, etc.) and files (e.g., executable files, boot loader files, etc.) stored in the storage 200. As is known in the art, data stored in storage devices may become damaged (e.g., changed, corrupted, erased, or combinations thereof). Such damage may occur, for example, during transmission, storage, encryption, and decryption of data and files. The repair modules 412, 418 may be configured to instruct the control circuitry 500 to detect such damage to the data and files. The repair modules 412, 418 may also be configured to instruct the control circuitry 500 to repair damaged data and files. The repair modules 412, 418 may also be configured to instruct the control circuitry 500 to replace damaged data and files with undamaged replacement data and files if attempted repairs fail, or if the repair modules 412, 418 determine that the data and files are irreparably damaged. In some embodiments, some of these undamaged replacement data and files may be included in the new files 416 of the update package 400. In some embodiments, some of these undamaged replacement data and files may be stored by the software update server 150, and the repair modules 412, 418 may be configured to instruct the control circuitry 500 to request that the software update server 150 transmit the undamaged replacement data and files to the communication endpoint 160. The repair modules 412, 418 may be configured to instruct the control circuitry 500 to replace the damaged data and files with the undamaged replacement data and files.

In some embodiments, the repair modules 412, 418 may be configured to instruct the control circuitry 500 to perform execution tests of executable files stored in the storage 200 to determine whether the executable files execute properly. If the execution tests indicate that the executable files do not execute properly, the repair modules 412, 418 may be configured to instruct the control circuitry 500 to attempt to at least one of repair and replace the executable files.

The repair modules 412, 418 may also be configured to collect and generate report information, and transmit a report of the report information to the software update server 150. In some embodiments, the report information may include logs of the processes performed by the repair modules 412, 418 (e.g., diagnosis and repair logs, file installation logs, etc.). In some embodiments, the report information may include information regarding the combo image 300 that the new combo image 414 replaced. The report information may be used to identify system flaws and common user errors, and enable developers to design more robust software to overcome and avoid the identified flaws and errors.

The boot loader and settings repair modules 412 may be configured to instruct the control circuitry 500 to diagnose, repair, and replace files and data stored in the boot loader partition 270 and the boot loader settings partition 272. In other words, the boot loader and settings repair modules 412 may be configured to instruct the control circuitry 500 to at least one of diagnose, repair, and replace the boot loader and the boot loader settings. Although boot loader files and boot loader settings are often stored in protected partitions, such data can still be damaged. If data and files stored in the boot loader partition 270 or the boot loader settings partition 272 become even slightly damaged, the communication endpoint may fail to boot. The boot loader and settings repair modules 412 may enable the control circuitry to detect and repair such damage before such a booting failure occurs, in some instances.

In some embodiments, the boot loader and settings repair modules 412 may be configured to diagnose and repair structural errors of the boot loader. Responsive to diagnosing such structural errors, the boot loader and settings repair modules 412 may be configured to reconfigure (e.g., restructure) the boot loader.

In some embodiments, the boot loader may be diagnosed as irreparable. Also, in some embodiments, the boot loader and settings repair modules 412 may fail to repair the boot loader responsive to diagnosing a damaged boot loader. In these embodiments involving a boot loader that has incurred irreparable damage, the boot loader and settings repair modules 412 may be configured to instruct the control circuitry 500 to replace the boot loader. The boot loader and settings repair modules 412 may be configured to replace the irreparable boot loader themselves, or call on the installation modules 419 to replace the boot loader, as will be discussed below.

The file system repair modules 418 may be configured to instruct the control circuitry 500 to diagnose and repair a file system (e.g., the root file system 324, and the other file systems mounted to the root file system) of the communication endpoint 160. In some embodiments, the file system repair module 418 may be configured to instruct the control circuitry 500 to diagnose and repair the root file system 324. By way of non-limiting example, the file system repair modules 418 may be configured to detect anomalies (e.g., errors, warnings, etc.) during boot-up. Damage to the root file system 324 can cause boot failures because the root file system 324 includes files that are used for booting the system, and because other file systems are mounted to the root file system 324 while booting up. The file system repair modules 418 may be configured to instruct the control circuitry 500 to at least one of repair and replace damaged portions (e.g., the entire root file system 324) of the root file system 324 if anomalies are detected during boot-up.

The file system repair modules 418 may also be configured to instruct the control circuitry 500 to diagnose and repair some (e.g. all) of the other files systems. By way of non-limiting example, the file system repair modules 418 may be configured to instruct the control circuitry 500 to detect failed and uninitialized partitions of the storage 200. Responsive to detections of uninitialized partitions, the file system repair modules 418 may be configured to instruct the control circuitry 500 to initialize (i.e., format) the uninitialized partitions.

In some embodiments, the file system repair modules 418 may be configured to instruct the control circuitry 500 to reconfigure (i.e. repartition) the storage 200. By way of non-limiting example, the file system repair modules 418 may be configured to instruct the control circuitry 500 to add storage space held in reserve by the extended partition 274 to at least one of the boot loader partition 270, the boot loader settings partition 272, the first combo image partition 278-1, the second combo image partition 278-2, and the user data partition 276.

In some embodiments, the file system repair modules 418 may also be configured to instruct the control circuitry 500 to detect faulty, corrupted, missing, and out-of-date data and files. Responsive to detecting faulty, corrupted, missing, and out-of-date data and files, he file system repair modules 418 may be configured at least one of repair and replace the faulty, corrupted, missing, and out-of-date data and files. By way of non-limiting example, the file system repair modules 418 may be configured to update, repair, and reconfigure local databases stored in the user data partition 276 of the storage 200.

The installation modules 419 may be configured to instruct the control circuitry 500 to install new software applications, update existing software applications, and remove unused and unwanted auxiliary tools and software applications. By way of non-limiting example, when the control circuitry 500 executes the installation modules 419, the control circuitry 500 may store the new software applications to the appropriate partitions of the storage 200. By providing a new combo image 414 that is compatible with any software or firmware updates installed by the installation modules 419, a provider of the update package 400 may avoid at least some of the versioning issues that often arise between the new combo image 400 and the installed software and firmware updates.

Once the checksum has verified their integrity, the control circuitry 500 may execute the boot loader and settings repair modules 412, the file system repair modules 418, and the installation modules 419. As a result, not only may the update package 400 enable a provider of the update package 400 to provide new software applications and new combo images 414, but the update package 400 may also enable the provider to remotely customize and repair damaged boot loaders, boot loader settings, and file systems of the communication endpoint 160.

The new files 416 of the update package 400 may include any files that may be helpful for software installation on, repair of, and operation of the communication endpoint 160. In some embodiments, the new files 416 may include files that the repair modules 412, 418 may use to replace files that the repair modules 412, 418 failed to repair. By way of non-limiting example, the new files 416 may include a new boot loader that the control circuitry 500 may use to overwrite the boot loader stored in the boot loader partition 270. In this example, at least one of the installation modules 419 and the repair modules 412, 418 may determine a unique identifier (e.g., a media access control (MAC) address) corresponding to the communication endpoint 160 and write that unique identifier to the new boot loader file. In some embodiments, the new boot loader may be received without a unique identifier written to the new boot loader file, and the at least one of the installation modules 419 and the repair modules 412, 418 may be configured to determine the unique identifier (e.g., by reading the boot loader stored in the boot loader partition 270) and write the unique identifier to the new boot loader. In some embodiments, the update package 400 may include the unique identifier with the combo image 300 so that any repair or other change (e.g., installation, reinstallation, etc.) may not lose the communication endpoint's unique identifier.

Also by way of non-limiting example, the new files 416 may include files intended to replace files stored in the user data partition 276. For example, if it is determined that there is a problem with a user's contacts list stored in the user data partition 276, the new files 416 may include files that may replace the problematic contacts list files.

Figure 5:
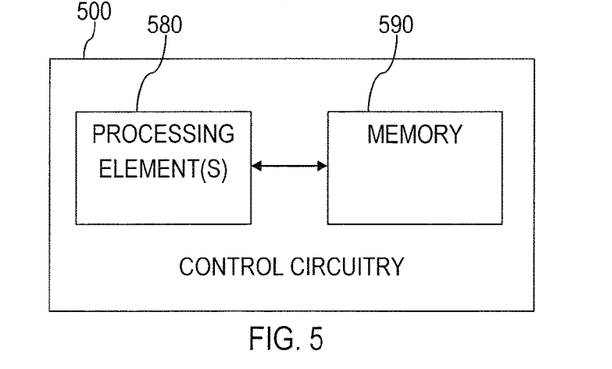
FIG. 5 is a simplified block diagram of control circuitry of the communication endpoint of the software update system of FIG. 1.

FIG. 5 is a simplified block diagram of the control circuitry 500 of the communication endpoint 160 of FIG. 1. The control circuitry 500 may include one or more processing elements 580 (hereinafter "processing elements" 580) operably coupled to one or more memory devices 590 (hereinafter "memory" 590). In some embodiments, the memory 590 may include volatile data storage elements. By way of non-limiting example, the memory 590 may include random access memory (RAM).

The memory 590 may be configured to store computer readable instructions configured to instruct the processing elements 580 to perform functions that the control circuitry 500 is configured to perform, as discussed herein (e.g., the method of FIG. 6 below). For example, the processing elements 580 may be configured to load computer-readable instructions stored in the storage devices 200 to the memory 590 for execution (e.g., the boot loader, the secondary boot loader, etc.) by the processing elements 580.

In some embodiments, the processing elements 580 may include a microcontroller, a central processing unit (CPU), other processing circuit, or combinations thereof. In some embodiments, the processing elements 580 may be implemented separately from the memory 590 and the storage 200 (FIG. 2). In some embodiments, the processing elements 580 may be integrated as a single device with at least a portion of at least one of the memory 590 and the storage 200.

Figure 6:
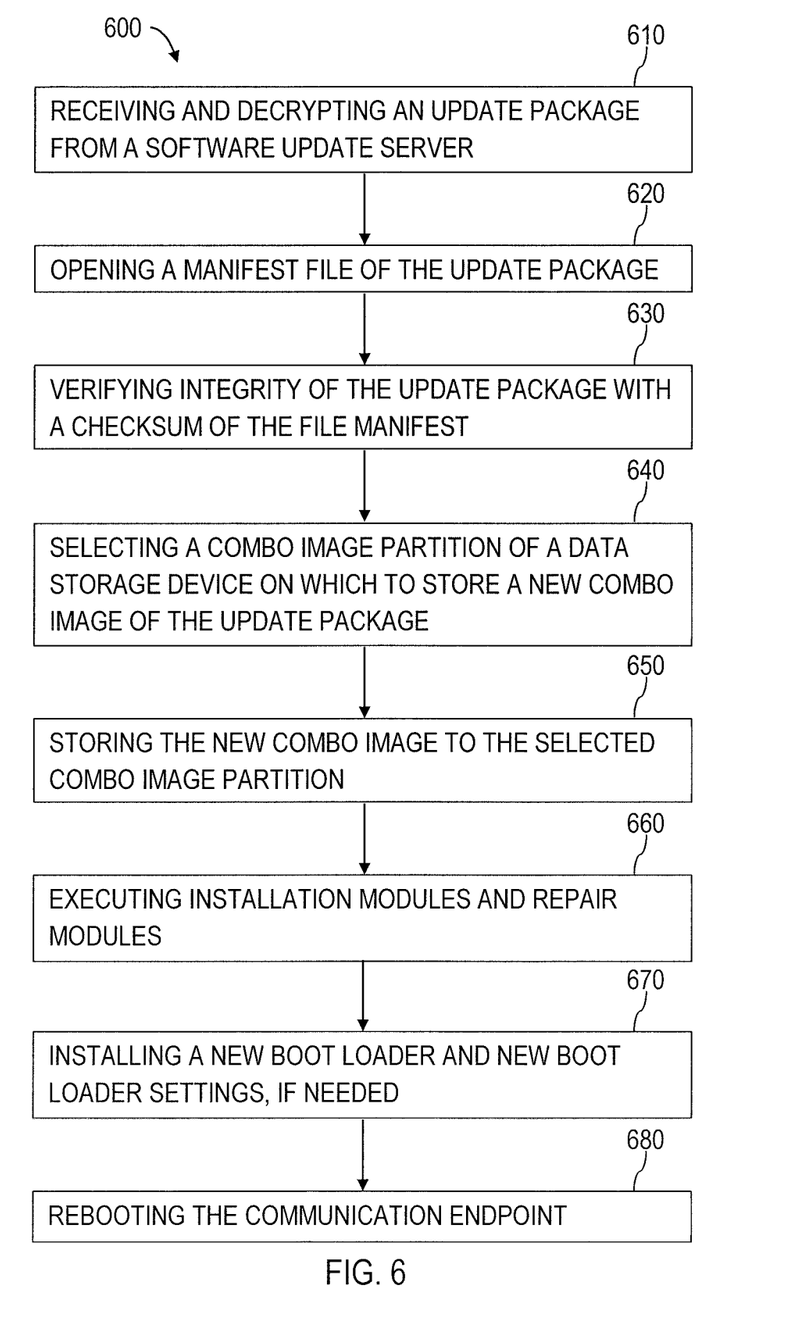
FIG. 6 is a flow chart illustrating a method of performing a software update of the communication endpoint of the software update system of FIG. 1.

FIG. 6 is a flow chart 600 illustrating a method of performing a software update on a communication endpoint 160 (FIG. 1). Referring to FIGS. 1 through 4 and 6 together, at operation 610, the method may include receiving and decrypting an update package 400 from a software update server 150. In some embodiments, receiving the update package 400 may include receiving, with control circuitry 500, an encrypted update package 102 from the software update server 150 through communication elements 162 of a communication endpoint 160, and decrypting the encrypted update package 102 to obtain the update package 400. The update package 400 may be stored for installation. In some embodiments, the control circuitry 500 may wait for a predetermined amount of time to determine whether the communication endpoint 160 is in an idle state before proceeding with the installation of the update package 400. For example, the control circuitry 500 may wait for 10 minutes from the most recent call with a far-end user before proceeding to install the update package 400.

At operation 620, the method may include opening a manifest file 410 of the update package 400. The manifest file 410 may be configured to identify the contents of the update package 400, determine compatibility with the firmware of the communication endpoint 160, and provide instructions for using the contents of the update package 400. The manifest file 410 may include a checksum configured to verify the integrity of the update package 400.

At operation 630, the method may include verifying the integrity of the update package 400 with the checksum of the manifest file 410. The control circuitry 500 may be configured to apply at least some of the contents of the update package to the checksum. By way of non-limiting example, the control circuitry 500 may apply at least one of the repair modules 412, 418, the installation modules 419, and the new combo image 414 to the checksum. If the control circuitry 500 verifies the integrity of the contents of the update package 400, the control circuitry 500 may proceed to use the contents of the update package 400. If, however, the control circuitry 500 fails to verify the integrity of the contents of the update package 400, the control circuitry 500 may not use the unverified contents of the update package 400 (e.g., none of the contents of the update package 400).

At operation 640, the method may include selecting a combo image partition 278 of a data storage device 200 on which to store a new combo image 414 of the update package 400. In some embodiments, selecting the combo image partition 278 may include selecting another combo image partition 278 besides the combo image partition 278 that was last used to successfully boot the communication endpoint 160.

At operation 650, the method may include storing the new combo image 414 to the selected combo image partition 278. In some embodiments, storing the new combo image 414 to the selected combo image partition 278 may include overwriting a combo image 300 stored to the selected combo image partition 278 with the new combo image 414. In some embodiments, storing the new combo image 414 to the selected combo image partition 278 may include clearing the storage elements of the selected combo image partition 278, and storing the new combo image 414 to the selected combo image partition 278.

At operation 660, the method may include executing the installation modules 419 and repair modules 412, 418 of the update package 400. In some embodiments, executing the repair modules 412, 418 may include detecting damaged data and files stored in the storage 200. By way of non-limiting example, detecting damaged data and files includes detecting at least one of data and files that are irreparable. In some embodiments, detecting damaged data and files may include performing execution tests of executable files to determine whether the executable files execute properly. In some embodiments, executing the repair modules 412, 418 may include attempting to repair damaged data and files. In some embodiments, executing the repair modules 412, 418 may include replacing damaged data and files with undamaged replacement data and files.

In some embodiments, executing the repair modules 412, 418 may include executing boot loader and settings repair modules 412 configured to at least one of diagnose, repair, and replace at least one of a boot loader and boot loader repair settings. In some embodiments, executing the boot loader and settings repair modules 412 includes diagnosing structural errors of the boot loader, and reconfiguring the boot loader to repair the structural errors.

In some embodiments, executing the repair modules 412, 418 includes executing the file system repair modules 418. In some embodiments, executing the file system repair modules 418 includes at least one of diagnosing, repairing, and replacing at least one of data and files stored in the storage 200. In some embodiments, executing the file system repair modules 418 includes at least one of diagnosing, repairing, and replacing a root file system 324. In some embodiments, diagnosing the root file system 324 may include detecting anomalies during boot-up. In some embodiments, executing the file system repair modules 418 includes at least one of detecting, repairing, and replacing failed and uninitialized partitions of the storage 200. In some embodiments, executing the file system repair module may include reconfiguring (i.e., repartitioning) the storage 200. In some embodiments, executing the file system repair modules 418 may include at least one of diagnosing, repairing, and replacing at least one of faulty, corrupted, missing, and out-of-date data and files.

At operation 670, the method may include installing a new boot loader and new boot loader settings, if needed. By way of non-limiting example, if the boot loader and settings repair modules 412 diagnose irreparable damage to at least one of the boot loader and the boot loader settings, at least one of a new boot loader and new boot loader settings may be installed. In some embodiments, installing the new boot loader comprises writing a unique identifier of the communication endpoint (e.g., a MAC address) to a new boot loader, and writing the new boot loader over the boot loader.

At operation 680, the method may include rebooting the communication endpoint 160. The communication endpoint 160 may be rebooted using the new combo image 414 stored in the selected combo image partition 278. If the reboot using the new combo image 414 fails, the communication endpoint 160 may be rebooted using the combo image 300 stored in the other combo image partition 278.

Figure 7:
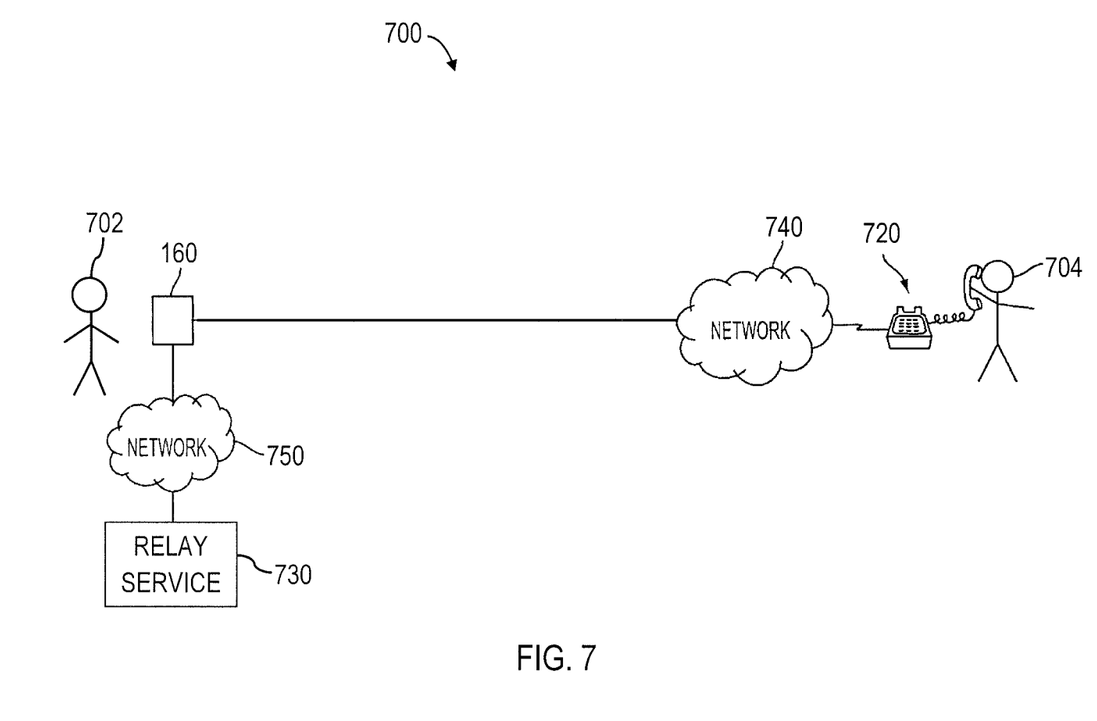
FIG. 7 illustrates a communication system configured to facilitate an assisted call between an audibly impaired user and a far-end user.

FIG. 7 illustrates a communication system 700 configured to facilitate an assisted call between an audibly impaired user 702 and a far-end user 704. The communication system 700 may include a communication endpoint 160 (as previously discussed with reference to FIG. 1), a far-end communication endpoint 720, and a relay service 730. The communication endpoint 160 and the far-end communication device 720 may be coupled together to facilitate communication therebetween via a first network 740. The communication endpoint 160 and the relay service 730 may be coupled together to facilitate communication therebetween via a second network 750. For example only, the first network 740 and the second network 750 may each be implemented according to the standards and bandwidth requirements of a communication network (e.g., Public Switch Telephone Network (PSTN), cellular network, Voice Over Internet Protocol (VOIP) networks, etc.). The use of the terms "network" or "communication network" as used herein contemplates networks that are compatible and configured to provide communications using analog and/or digital standards unless specifically stated otherwise. In some embodiments, the first network 740 and the second network 750 may be the same network (e.g., both connections may be Internet-based connections). Thus, discussion of the first network 740 and the second network 750 separately may be for convenience of discussing a particular connection between two or more devices. Of course, in some embodiments, the first network 740 and the second network 750 may be different networks. For example, the communication endpoint 160 and the far-end communication endpoint 720 may communicate via a PSTN network connection, while the communication endpoint 160 and the far-end communication endpoint 720 may communicate via an internet connection. Other variations and combinations of networks are also contemplated.

The communication endpoint 160 may include a device that is configured to assist the audibly impaired user 702 in communicating with another individual (e.g., far-end user 704). In some embodiments, the communication endpoint 160 may include a caption-enabled communication device configured to receive and display a text caption of at least a portion of the conversation. Thus, the audibly impaired user 702 may be able to read the text caption of the words spoken by the far-end user 704 to supplement the audio signal received by the communication endpoint 160. As a result, the audibly impaired user 702 may have an improved experience in understanding the conversation. Such an embodiment may be useful for people whose hearing has been damaged or decreased over time (e.g., the elderly); such that they can still speak but have diminished hearing that makes it difficult to communicate. In some embodiments, the communication endpoint 160 may also be configured to receive and display video on an electronic display on the communication endpoint 160.

The far-end communication endpoint 720 may comprise a conventional voice telephone (e.g., landline phone, cellular phone, smart phone, VoIP phone, etc.). As such, the far-end user 704 may interact in a conventional manner with the far-end communication endpoint 720. In some embodiments, the far-end communication endpoint 720 may be configured similarly as the communication endpoint 160 (e.g., caption-enabled communication device). As a result, the far-end communication endpoint 720 may likewise be operated by an audibly impaired user. Thus, although facilitating communication between the audibly impaired user 702 and the far-end user 704 is shown in FIG. 1 to imply that the far-end user 704 is an audibly capable user, such a situation is shown only as an example. Other embodiments include both the communication endpoint 160 and the far-end communication endpoint 720 coupled to the relay service 730 to facilitate the captioning services for each respective audibly impaired user. In such a situation, each communication endpoint 160, 720 may have its own communication session with the relay service 730.

The relay service 730 may be configured to provide interpretive services (e.g., captioning) to the audibly impaired user 702. More specifically, a human "call assistant" within relay service 730 may be employed to facilitate an assisted call between an audibly impaired user 702 and a far-end user 704. As discussed above, in some embodiments the relay service 730 may be configured to provide text captions of at least a portion of the conversation. In such an embodiment, the call assistant may listen to the voice signal received and re-voice the portion of the conversation into a microphone so that voice recognition software may generate the text caption that is transmitted to the communication endpoint 160. Thus, the relay service 730 may include one or more of an internet protocol captioned telephone service (IPCTS), captioned telephone service (CTS), or other telecommunications relay services (TRS).

FIG. 7 shows a configuration where the communication endpoint 160 acts as a router for the voice signal from the far-end communication endpoint 720 to the relay service 730. In such an embodiment, the voice signal of the far-end user 704 may be transmitted from the far-end communication endpoint 720 to the communication endpoint 160. The voice signal of the far-end user 704 may then be transmitted from the communication endpoint 160 to the relay service 730 for the text caption to be generated in a text captioning embodiment. The text caption may then be transmitted from the relay service 730 to the communication endpoint 160 to be displayed as a text caption for the audibly impaired user to read during the conversation. The call assistant may also monitor the text caption that is generated and transmitted to the first communication device 110 to identify any errors that may have been generated by the voice recognition software. The call assistant may correct such errors, such as described in U.S. Pat. No. 8,379,801, issued Feb. 19, 2013, entitled "Methods and Systems Related to Text Caption Error Correction," the disclosure of which is incorporated herein in its entirety by this reference. In some embodiments the relay service 730 may be configured to receive the voice signal from the far-end communication endpoint 720 and route the voice signal to the communication endpoint 160.

In addition, although FIG. 7 shows only two communication endpoints 160, 720, the communication system 700 may include more communication endpoints. It is contemplated that the communication system 700 may facilitate communication between any number and combinations of audibly impaired users and far-end users. For example, in some embodiments two or more communication endpoints may be connected for facilitating communication between an audibly impaired user and other audibly impaired users and/or far-end users.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A method of operating a software update system for updating software on a communication endpoint, the method comprising:

providing a data storage device on the communication endpoint including a boot loader partition comprising a boot loader, a boot loader settings partition comprising boot loader settings, a first combo image partition comprising a combo image, a second combo image partition comprising a copy of the combo image, and an extended partition configured to serve as a storage placeholder in case more data storage space is needed, wherein the combo image includes at least a secondary boot loader, a root file system, and an operating system kernel;

operating a file system on the communication endpoint from the combo image based on a successful boot from either a first combo image partition or a second combo image partition of the communication endpoint, the successful boot including:

attempting to boot the communication endpoint using the combo image from the first combo image partition; and attempting to boot the communication endpoint using the copy of the combo image from the second combo image partition responsive to a failure of the first combo image partition;

transmitting an encrypted update package from a software update server to the communication endpoint for updating and repairing the at least one of software or firmware stored on the communication endpoint, the encrypted update package including:

a new combo image including a combination of a new secondary boot loader, a new root file system, and a new operating system kernel; and one or more repair modules configured to diagnose and repair damaged data and files with undamaged replacement data and files with undamaged replacement data and files for at least one of a boot loader, boot loader settings, and a file system of the communication endpoint;

receiving and decrypting the update package including the new combo image at the communication endpoint;

restructuring a size of each of the first combo image partition, the second combo image partition, and the extended partition responsive to the new combo image having a greater size than the first combo image partition and the second combo image partition;

replacing, with the control circuitry, the combo image with the new combo image in the first combo image partition of the data storage device responsive to determining that the copy of the combo image from the second combo image partition was used as for the most recent successful boot;

replacing, with the control circuitry, the copy of the combo image with the new combo image in the second combo image partition of the data storage device responsive to determining that the combo image from the first combo image partition was used as for the most recent successful boot; and executing, with the control circuitry, at least one of the one or more repair modules to diagnose and repair damaged data and files with undamaged replacement data and files in at least one of the boot loader, the boot loader settings, and the file system of the communication endpoint.

2. The method of claim 1, wherein executing at least one of the one or more repair modules comprises at least one of repairing and replacing damaged data and files with undamaged replacement data and files in at least one of the boot loader and the boot loader settings.

3. The method of claim 1, wherein executing at least one of the one or more repair modules comprises performing execution tests of executable files stored in the data storage device and repairing and replacing the executable files.

4. A software update system comprising:
a software update server including:
  a data storage device including an update package comprising:
    a new combo image configured to replace a combo image stored by a communication endpoint, the new combo image comprising a combination of a new secondary boot loader, a new root file system, and a new operating system kernel for the communication endpoint; and
    one or more repair modules configured to instruct the communication endpoint to diagnose and repair damaged data and files with undamaged replacement data and files for at least one of a boot loader, boot loader settings, and a file system of the communication endpoint; and
  communication elements configured to encrypt and transmit the update package to the communication endpoint through one or more networks; and
the communication endpoint including:
  a data storage device including:
    a boot loader partition comprising a boot loader;
    a boot loader settings partition comprising boot loader settings;
    a first combo image partition comprising a combo image including a secondary boot loader, a root file system, and an operating system kernel;
    a second combo image partition comprising a copy of the combo image;
    an extended partition configured to serve as a storage placeholder in case more data storage space is needed;
  communication elements configured to receive an encrypted update package from a software update server through the one or more networks; and
  control circuitry operably coupled to the data storage device and the communication elements, the control circuitry configured to:
    attempt to boot up using the combo image stored in the first combo image partition;
    attempt to boot up using the copy of the combo image stored in the second combo image partition responsive to a failure of the first combo image partition;
    receive and decrypt the update package;
    select one of the first combo image partition and the second combo image partition that was not the last combo image partition used during a successful boot up, and replace the combo image stored in the selected one of the first combo image partition and the second combo image partition with the new combo image from the update package;
    restructure a size of each of the first combo image partition, the second combo image partition, and the extended partition responsive to the new combo image having a greater size than the first combo image partition and the second combo image partition;
    execute the at least one repair module and diagnose and repair damaged data and files with undamaged replacement data and files.

5. The software update system of claim 4, wherein the at least one repair module includes a file system repair module configured to diagnose and repair damaged data and files with undamaged replacement data and files in the root file system of the communication endpoint.

6. The software update system of claim 4, wherein control circuitry of the communication endpoint is further configured to restructure a size of the boot loader partition, and the boot loader settings partition responsive to additional space being needed when updating installing the new combo image to the communication endpoint.

7. The software update system of claim 4, wherein the at least one repair module of the is configured to replace the boot loader with a new boot loader responsive to at least one of diagnosing the boot loader with irreparable damage, and failing to repair the boot loader.

8. The software update system of claim 4, wherein the update package further includes new files, and wherein the control circuitry is further configured to store the new files in the appropriate ones of the boot loader partition, the boot loader settings partition, and a user data partition.

9. The software update system of claim 8, wherein the new files include a new boot loader, and wherein the control circuitry is further configured to:
determine a unique identifier of the communication endpoint;
replace the boot loader with the new boot loader; and
write the unique identifier of the communication endpoint to the new boot loader.

10. The software update system of claim 9, wherein the unique identifier of the communication endpoint comprises a media access control address.

11. The software update system of claim 4, wherein the boot loader is configured to enable the control circuitry to address at least sixteen (16) gigabytes of storage of the data storage device.

12. The software update system of claim 4, wherein the boot loader is configured to enable the control circuitry to address at least substantially all storage of the data storage device.

13. The software update system of claim 4, wherein the data storage device comprises a flash memory device.

14. The software update system of claim 4, wherein the communication endpoint comprises a text-captioned phone configured to establish a voice communication session with a far-end and a remote captioning service and to display text captions received from the remote captioning service during the voice communication session.

15. The software update system of claim 4, wherein the update package includes a manifest file comprising a checksum configured to verify the integrity of the new combo image and the one or more repair modules.

16. The software update system of claim 4, wherein the one or more repair modules include at least one boot loader repair module configured to, when executed by the communication endpoint, diagnose and repair the boot loader of the communication endpoint.

17. The software update system of claim 4, further comprising an encryptor operably coupled to the data storage device and configured to encrypt the update package to obtain an encrypted update package, wherein the communication elements are configured to transmit the encrypted update package to the communication endpoint.

18. The software update system of claim 4, wherein the one or more repair modules include a file system repair module configured to instruct the communication endpoint to at least one of diagnose, repair, and replace at least one file system of the communication endpoint.

19. The software update system of claim 4, wherein the one or more repair modules are further configured to generate a report and transmit the report to the software update server, the report including logs of processes performed by the repair modules selected from the group consisting of diagnosis and repair logs, file installation logs, and information regarding the combo image replaced by the new combo image.

20. The software update system of claim 4, wherein the data storage device of the communication endpoint is configured to store the update package and thereafter automatically install the update package after a predetermined period of time has elapsed after a most recent call for the communication endpoint.

21. The software update system of claim 4, wherein the one or more repair modules are configured to request undamaged replacement data and files from the software update server over the one or more networks during repair and after the update package has been stored by the communication endpoint.

22. A text-captioned phone comprising:
a data storage device including:
   a boot loader partition comprising a boot loader;
   a boot loader settings partition comprising boot loader settings; and
   a first combo image partition comprising a combo image including a secondary boot loader, a root file system, and an operating system kernel;
   a second combo image partition comprising a copy of the combo image;
communication elements configured to receive an update package from a software update server through one or more networks, the update package including:
   a file manifest including a checksum configured to verify the integrity of the update package;
   a new combo image configured to replace the combo image stored in the first combo image partition and the second combo image partition, wherein the new combo image includes at least one of a new secondary boot loader, a new root file system, and a new operating system kernel;
   a boot loader and settings repair module configured to at least one of diagnose, repair, and replace at least one of the boot loader and the boot loader settings; and
   a file system repair module configured to at least one of diagnose, repair, and replace a file system of the text-captioned phone; and
control circuitry operably coupled to the data storage device and the communication elements, the control circuitry configured to:
   attempt to boot using the combo image from the first combo image partition;
   attempt to boot using the copy of the combo image from the second combo image partition responsive to a failure of the first combo image partition;
   select one of the first combo image partition and the second combo image partition based on which of the first combo image partition or the second combo image partition was not used as for the most recent successful boot;
   replace the combo image stored in the selected one of the first combo image partition and the second combo image partition with the new combo image;
   execute the boot loader and settings repair module and the file system repair module; and
   enable a user of the text-captioned phone to participate in substantially real-time communication sessions with an audibly capable user of a far-end audio endpoint through a first communication network with the assistance of a text-captioned relay service configured to communicate with the text-captioned phone through a second communication network.

23. The text-captioned phone of claim 22, wherein the control circuitry is further configured to:
attempt to boot using the new combo image in the first combo image partition; and
attempt to boot using the combo image in the second combo image partition responsive to a failure of the boot using the new combo image.

* * * * *